United States Patent
Smith et al.

(10) Patent No.: US 8,130,736 B2
(45) Date of Patent: Mar. 6, 2012

(54) METHOD AND SYSTEM FOR FACILITATING CHANNEL MEASUREMENTS IN A COMMUNICATION NETWORK

(75) Inventors: Nathan J. Smith, Crystal Lake, IL (US); George Calcev, Hoffman Estates, IL (US); Nitin R. Mangalvedhe, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 995 days.

(21) Appl. No.: 12/103,412

(22) Filed: Apr. 15, 2008

(65) Prior Publication Data

US 2009/0257413 A1 Oct. 15, 2009

(51) Int. Cl.
*H04W 4/00* (2009.01)
(52) U.S. Cl. ....................................... 370/338
(58) Field of Classification Search .................. 370/203, 370/229–240, 254–258, 310–350, 389–394, 370/395.1, 395.2, 395.3, 395.5, 395.42, 395.53, 370/400–410, 431–462, 464–488, 529–540
See application file for complete search history.

(56) References Cited

U.S. PATENT DOCUMENTS

| 6,807,165 | B2 | 10/2004 | Belcea | |
|---|---|---|---|---|
| 2002/0071449 | A1* | 6/2002 | Ho et al. | 370/447 |
| 2005/0190784 | A1* | 9/2005 | Stine | 370/445 |
| 2006/0039281 | A1* | 2/2006 | Benveniste | 370/230 |
| 2007/0060168 | A1* | 3/2007 | Benveniste | 455/450 |
| 2007/0225044 | A1* | 9/2007 | Law et al. | 455/562.1 |

OTHER PUBLICATIONS

IEEE 802.11, "Maintaining Synchronization," Part 11: Wireless LAN Medium Access Control (MAC) and Physical Layer (PHY) Specifications; Sections 11.1.2, 1999, pp. 123-125.
H-S. W. So and J. Walrand, Design of a Multi-Channel Medium Access Control Protocol for Ad-Hoc Wireless Networks, Berkeley, Technical Report No. UCB/EECS-2006-54, May 2006.
J. Wang, Y. Fang, and D. Wu, "A Power-Saving Multi-radio Multi-channel MAC Protocol for Wireless Local Area Networks," Proc. IEEE INFOCOM 2006.

* cited by examiner

*Primary Examiner* — Kwang B Yao
*Assistant Examiner* — Jung-Jen Liu
(74) *Attorney, Agent, or Firm* — Randi L. Karpinia (57) ABSTRACT

A method and system for facilitating channel measurements in a communication network is disclosed. The method includes contending for a control channel to reserve a logical subchannel of a data channel. The control channel operates in a first frequency band and the data channel operates in a second frequency band. Further, the method includes sending an announce message on the control channel for announcing a reservation at a particular time period of the logical subchannel of the data channel when the contention for the control channel is successful, sending a channel sense message on the logical subchannel of the data channel at the particular time period to facilitate at least one other node to perform channel measurements based on the channel sense message, and monitoring the data channel and performing channel measurements based on at least one other channel sense message received from the at least one other node.

34 Claims, 7 Drawing Sheets

METHOD AND SYSTEM FOR FACILITATING CHANNEL MEASUREMENTS IN A COMMUNICATION NETWORK

FIELD OF THE DISCLOSURE

The present disclosure relates generally to communication networks, and more particularly to facilitating channel measurements in communication networks.

BACKGROUND

In communication systems such as ad hoc radio systems, channel measurements are utilized for route selection based on link quality, spatial use of radio resources, interference avoidance, and rate and power control, among others. In ad hoc radio systems where the control and the data channels occupy a same band and are frequently interleaved in time with one another, channel measurements can be readily accomplished. In ad hoc radio systems, channel measurements can be made on a variety of transmission types, for instance, in IEEE (Institute of Electrical and Electronics Engineers) 802.11 systems, an exchange of request-to-send (RTS) and clear-to-send (CTS) messages can be used to estimate the quality of the channel.

Next generation ad hoc wireless communication networks may include data and control channels in separate physical channels (frequencies) located in separate frequency bands (e.g., 2.4 GHz and 5.7 GHz, respectively) to increase the overall data channel capacity. However, in such radio systems, the process of obtaining data channel measurements can be more complex than in current systems. For example, choosing the correct rate for an initial packet exchange between two nodes, or optimizing a resource allocation based on each link's particular condition may be more challenging when the control signaling is carried out in a first frequency band while the data communications take place in a second frequency band. This is because it is common for nodes in peer-to-peer systems to estimate the quality of the link between them by taking measurements of control messages such as the RTS and CTS messages.

One possible solution for measuring the data channel in such ad hoc radio systems would be to have nodes receive and measure the preambles and headers of packets transmitted on the data channel and destined to both themselves and other nodes. In this way, a node may gather information about the channel between itself and other nodes in the system. However, receiving numerous packets on a wideband data channel for the mere purpose of performing channel measurement/estimation is an inefficient use of a device's battery. In addition, this solution would not guarantee that link measurements would be available before a data exchange begins. Further, this solution would prove ineffective in radio systems employing Orthogonal Frequency Division Multiple Access (OFDMA), which allows multiple nodes to transmit simultaneously using only portions of the bandwidth. In these cases, channel measurements taken on data transmissions may not be available for the entire bandwidth of the data channel and thus may not be useful for determination of initial rate and power control. A full band measurement is especially critical when operating in very wide band channels (e.g. 80 MHz) as the fading and interference may vary across the channel. So, measuring only a portion of the channel could result in a node using either an overly optimistic or overly pessimistic channel measurement.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
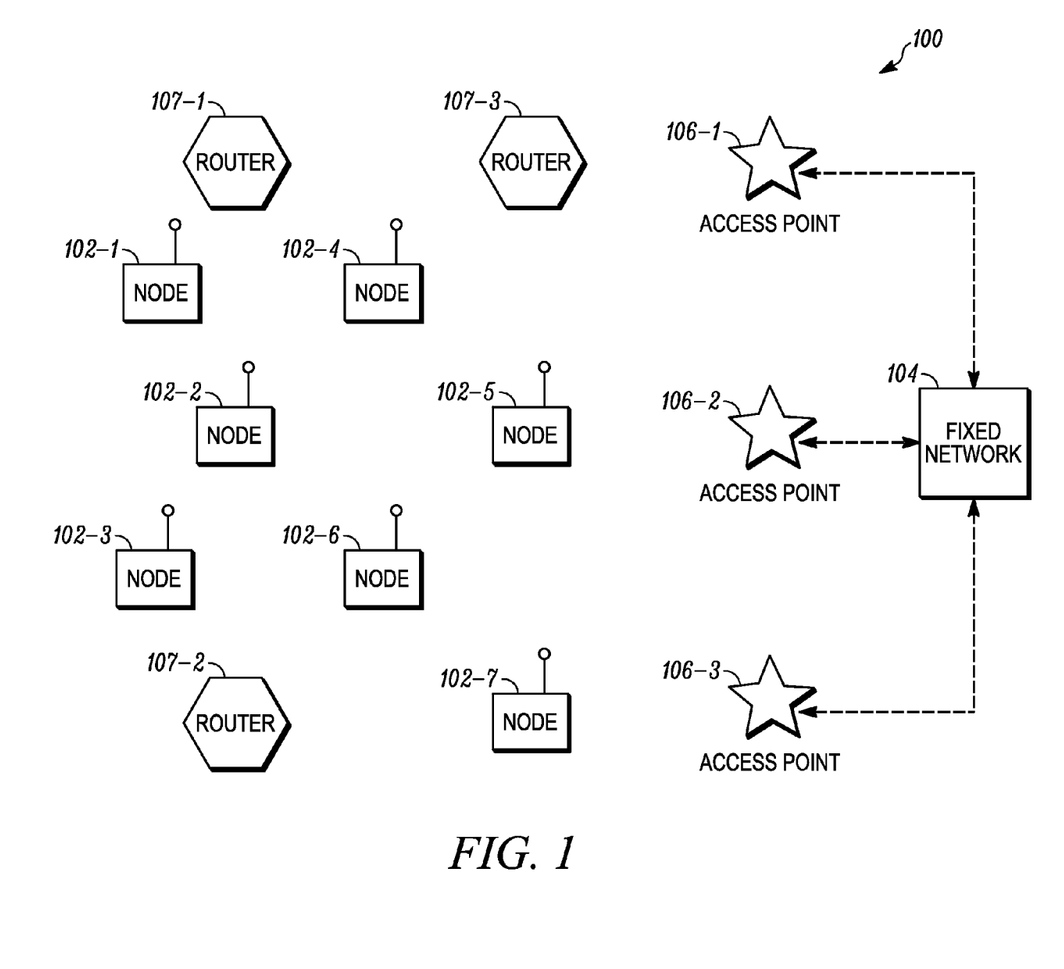
FIG. 1 is a block diagram of a communication network in accordance with some embodiments.

FIG. 1 is a block diagram illustrating an example communication network employing a method in accordance with some embodiments of the present invention. Specifically, FIG. 1 illustrates an ad hoc network 100. The ad hoc network 100 refers to a self-configuring network of radio devices connected by wireless links, the union of which forms an arbitrary topology. In accordance with embodiments of the present invention, the ad hoc network 100 includes control channels and data channels that are placed in separate frequency bands, such that, one or more propagation characteristics of the control channels are independent from one or more propagation characteristics of the data channel. The ad hoc network 100, for example, is a mesh enabled architecture (MEA) network or an 802.11 network (i.e. 802.11a, 802.11b, 802.11g, or 802.11s). It will be appreciated by those of ordinary skill in the art that the ad hoc network 100 in accordance with the present invention can alternatively comprise any packetized communication network where packets are forwarded across multiple wireless hops. For example, the ad hoc network 100 is a network utilizing OFDMA (orthogonal frequency division multiple access), or TDMA (time division multiple access), or GPRS (General Packet Radio Service), or EGPRS (Enhanced GPRS). Additionally, each wireless hop of the ad hoc network 100 either employs the same packet data protocol as the other hops, or a unique packet data protocol per hop.

As illustrated in FIG. 1, the ad hoc network 100 includes a plurality of nodes 102-1 through 102-*n* (referred to also as devices 102 or radio devices 102 or nodes 102 or mobile nodes 102 or communication devices 102), and can, but is not required to, include a fixed network 104 having a plurality of intelligent access points (IAP) 106-1, 106-2, . . . 106-*n* (referred to generally as nodes 106 or access points 106), for providing nodes 102 with access to the fixed network 104. The fixed network 104 includes, for example, a core local access network (LAN), and a plurality of servers and gateway routers to provide network nodes with access to other networks, such as other ad hoc networks, a public switched telephone network (PSTN) and the Internet. The ad hoc network 100 further can include a plurality of fixed or mobile routers 107-1 through 107-*n* (referred to generally as routers 107 or nodes 107 or communication devices 107) for routing data packets between other nodes 102, 106 or 107. It is noted that for purposes of this discussion, the nodes discussed above can be collectively referred to as "nodes 102, 106 and 107," or simply "nodes" or alternatively as "communication devices."

As can be appreciated by one skilled in the art, the nodes 102, 106 and 107 are capable of communicating with each other directly, or via one or more other nodes 102, 106 or 107 operating as a router or routers for packets being sent between nodes. It can also be appreciated that nodes 102 can take on the role of routers in ad hoc networks. The ad hoc network 100 facilitates the nodes 102, 106, and 107 of the ad hoc network 100 to perform channel measurements in accordance with the embodiments of the present invention.

Figure 2:
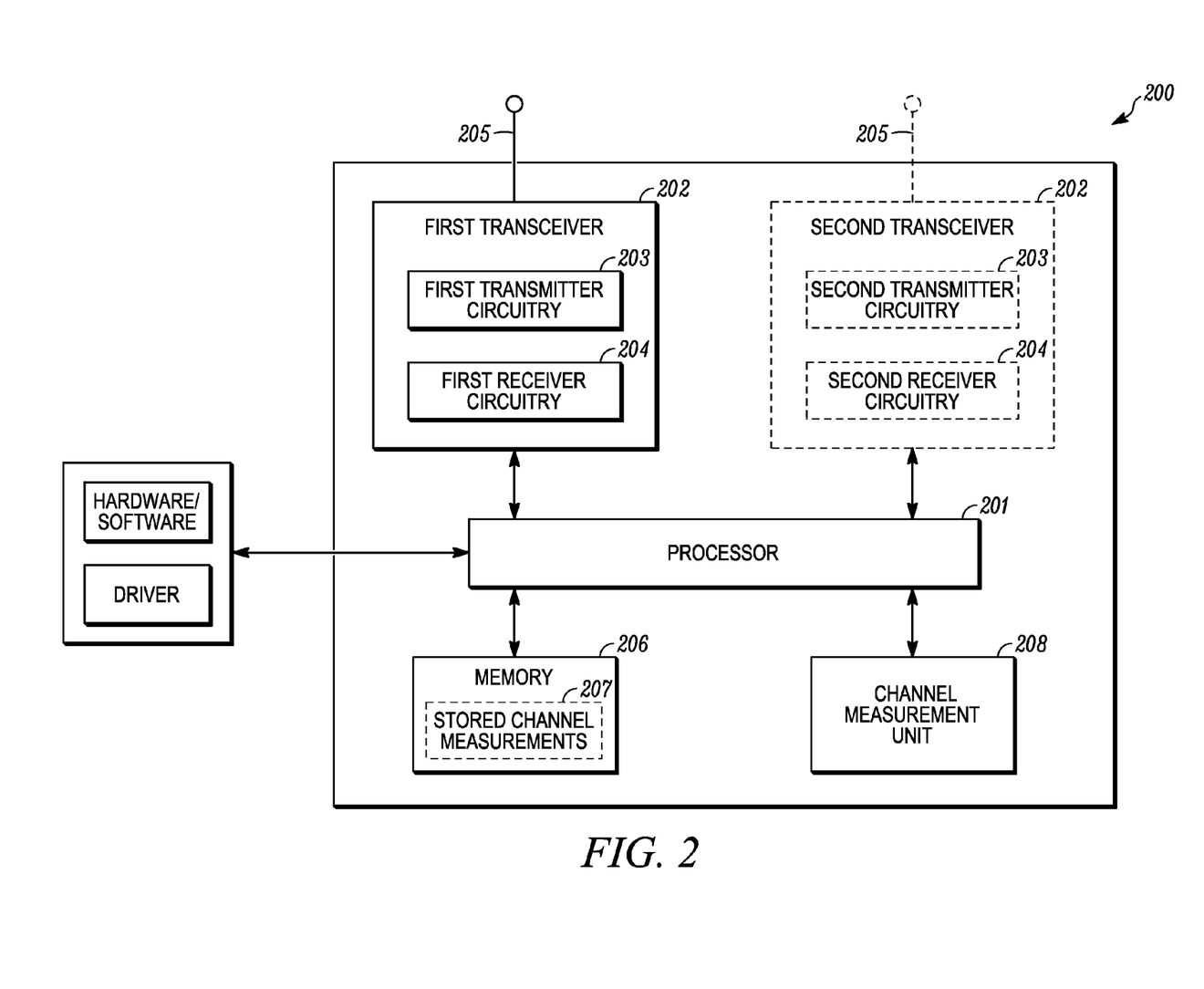
FIG. 2 is a block diagram of a node employed in the communication network shown in FIG. 1 in accordance with some embodiments.

FIG. 2 is a block diagram of a node 200 that can be employed in nodes 102, 106, and 107 of the ad hoc network 100. The node 200 comprises a processor 201, one or more transceivers 202, each including a transmitter circuitry 203 and a receiver circuitry 204, an antenna 205 coupled to at least one of the transceivers 202, a memory 206 for storing operating instructions that are executed by the processor 201, and a channel measurement unit 208. The transceiver 202 receives and transmits signals, such as packetized signals, to and from other nodes, under the control of a processor 201. The node 200 optionally includes a display, an input device, a buffer memory, and communication interfaces. Although not shown, the node 200 also includes an antenna switch, duplexer, circulator, or other highly isolative means (not shown) for intermittently providing information packets from the transmitter circuitry 203 of the transceiver 202 to the antenna 205 and from the antenna 205 to the receiver circuitry 204 of the transceiver 202. The node 200 is an integrated unit containing at least all the elements depicted in FIG. 2, as well as any other elements necessary for the node 200 to perform its particular functions. Alternatively, the node 200 can comprise a collection of appropriately interconnected units, wherein such units perform functions that are equivalent to the functions performed by the elements of the node 200. For example, the node 200 includes a laptop computer and a wireless LAN (local area network) card.

The processor 201 includes one or more microprocessors, microcontrollers, DSPs (digital signal processors), state machines, logic circuitry, or any other device or devices that process information based on operational or programming instructions. Such operational or programming instructions are, for example, stored in the memory 206. The memory 206 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 206 containing the corresponding operational instructions may be embedded within the state machine or logic circuitry. The operations performed by the processor 201 and the rest of the node 200 are described in detail below.

The transmitter circuitry 203 and the receiver circuitry 204 enable the node 200 to communicate information packets to and acquire information packets from the other nodes. In this regard, the transmitter circuitry 203 and the receiver circuitry 204 include conventional circuitry to enable digital or analog transmissions over a wireless communication channel. The transmitter circuitry 203 and the receiver circuitry 204 may be designed to operate over both a cellular air interface (e.g., Global System for Mobile communication (GSM), Code Division Multiple Access (CDMA), Wide-band CDMA (WCDMA), Universal Mobile Telecommunications System (UMTS), and the like), an ad hoc networking air interface (e.g., BLUETOOTH, 802.11 WLAN (wireless local area network)), 802.16 WiMax, and the like.

The implementations of the transmitter circuitry 203 and the receiver circuitry 204 depend on the implementation of the node 200. For example, the transmitter circuitry 203 and the receiver circuitry 204 can be implemented as an appropriate wireless modem, or as conventional transmitting and receiving components of two-way wireless communication devices. In the event that the transmitter circuitry 203 and the receiver circuitry 204 are implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transmitter circuitry 203 and the receiver circuitry 204 are implemented as part of the wireless device hardware and software architecture in accordance with known techniques. Most, if not all, of the functions of the transmitter circuitry 203 and/or the receiver circuitry 204 are implemented in a processor, such as the processor 201. However, the processor 201, the transmitter circuitry 203, and the receiver circuitry 204 have been artificially partitioned herein to facilitate a better understanding.

The receiver circuitry 204 is designed to allow receiving of RF signals from within at least one band and bandwidth and optionally more bands and bandwidths, if the communications with the proximate device are in a frequency band or bandwidth other than that of the network communications. The receiver circuitry 204 optionally comprises a first receiver and a second receiver, or one receiver designed to allow receiving within two or more bands or bandwidths. The transceiver 202 includes at least one set of transmitter circuitry 203. The at least one transmitter 203 is designed to allow transmitting RF signals to at least one device within at least one band and bandwidth if the communications with the proximate devices are in a frequency band or bandwidth other than that of the network communications. The transmitter circuitry 203 optionally comprises a first transmitter and a second transmitter, or one transmitter designed to allow transmitting within two or more bands or bandwidths.

In accordance with some embodiments, when dual transceivers 202 are employed in the node 200, then one of the transceivers 202 is tuned to a control channel operating in a first frequency band, and the other transceiver 202 can be tuned to a data channel operating in a second frequency band.

Such utilization of dual transceivers minimizes the need for the node 200 to switch between the first frequency band and the second frequency band. Alternatively, a single transceiver 202 can be used, provided a contention for the control channel is terminated far enough in advance of beginning of a particular logical subchannel communication slot within the data channel so as to provide the transceiver 202 a sufficient time to transition between the two frequency bands.

The antenna 205 comprises any known or developed structure for radiating and receiving electromagnetic energy in the frequency range containing the wireless carrier frequencies.

The channel measurement unit 208 estimates channel parameters between the node itself and at least one other node of the ad hoc network 100 in accordance with some embodiments. In one embodiment, the estimated channel parameters between two nodes include at least one of an average gain or path loss for each subchannel across the data channel of the ad hoc network 100. The memory 206 stores and maintains the estimated channel measurements 207 for each other node of the ad hoc network 100.

Figures 3, 4:
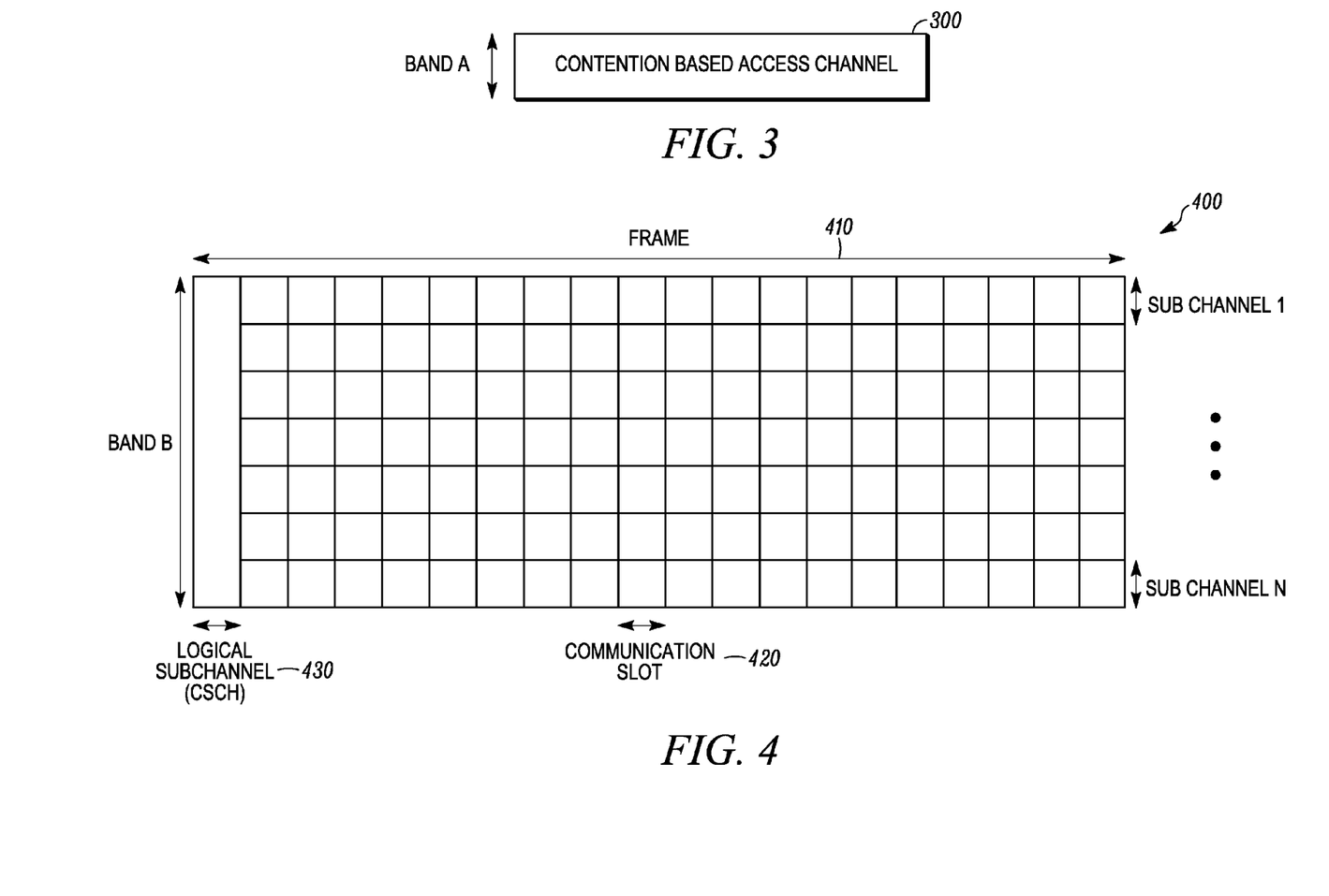
FIG. 3 illustrates a control channel utilized by the communication network shown in FIG. 1 in accordance with some embodiments.
FIG. 4 illustrates a data channel utilized by the communication network shown in FIG. 1 in accordance with some embodiments.

FIG. 3 illustrates a control channel 300 utilized by the communication network shown in FIG. 1. The control channel 300 is a contention based access channel and operates in a first frequency band (Band A). In one embodiment, the first frequency band is a narrowband frequency band (e.g. 2.4 GHz). In accordance with some embodiments, the control channel 300 allows the node 200 to contend among themselves, such that a node that wins the contention sends an announce message on the control channel 300. The announce message specifies that the node that has won the contention has reserved a particular time period of a subchannel of a data channel utilized by the communication network.

FIG. 4 illustrates data channel 400 utilized by the communication network shown in FIG. 1. The data channel 400 operates in a second frequency band (Band B). The second frequency band of the data channel 400 is separated from the first frequency band of the control channel such that the instantaneous propagation characteristics of the data channel 400 are different from the instantaneous propagation characteristics of the control channel 300. In one embodiment, the second frequency band is a wideband frequency band (e.g. 80 MHz channel in the 5.7 GHz band). In accordance with some embodiments, a frame 410 of the data channel 400 is divided into a plurality of communication slots 420, whereby one communication slot spans across a plurality of logical subchannels (subchannels 1 through N). For example, a logical subchannel 430, in the data channel, allows node 200 to transmit a special full band channel sense message (CSM) that is used by other nodes of the ad hoc network 100 to assess the data channel 400 between itself and a transmitting node. In accordance with some embodiments, the logical subchannel 430 is referred to as a channel sense logical channel (CSCH). To facilitate channel measurements among the nodes 200, the special full band channel sense message is transmitted at a predefined transmit power or includes a value in a packet payload of the channel sense message that is used to identify a transmit power that was used for the transmission of the channel sense message.

Figure 5:
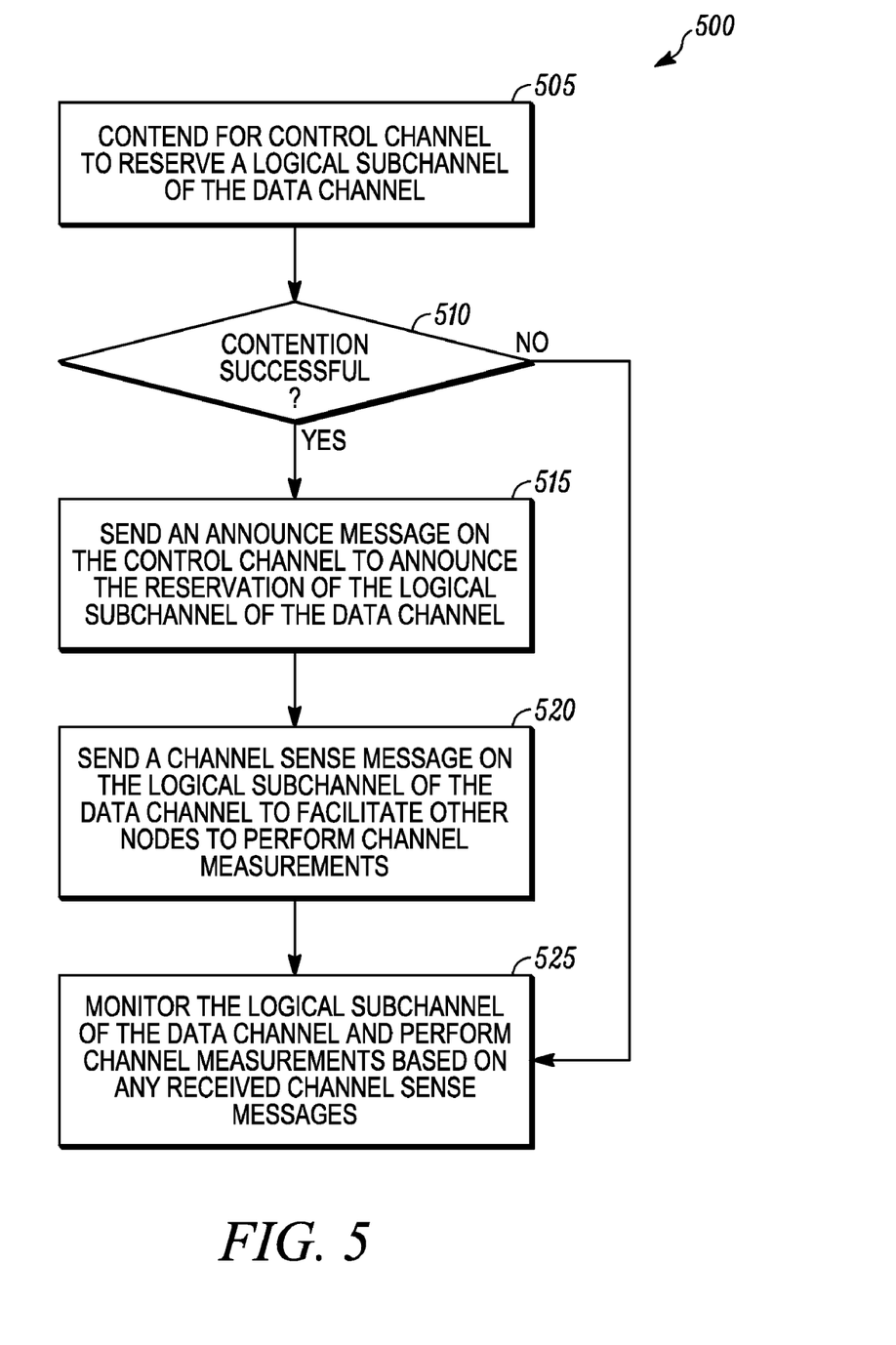
FIG. 5 is a flowchart of a method of facilitating channel measurements in a communication network in accordance with some embodiments.

FIG. 5 is a flowchart of a method of facilitating channel measurements in a communication network, such as ad hoc network 100, in accordance with some embodiments. The method 500 begins when the nodes 200 within the ad hoc network 100 are partitioned into two sets, namely an active set and an inactive set, based on the status of each of the nodes 200. The inactive set includes nodes that are currently in a standby state. The active set includes nodes that are either currently participating in a data communication with at least one other node, or preparing to participate in a data communication with at least one other node, or are temporarily transitioning from a standby state in order to, for instance, determine if there is a data awaiting their reception from at least one other node. As can be appreciated by a person of ordinary skill in the art, each node 200 determines to which set it belongs autonomously, through a distributed algorithm, or may have its membership determined for it by a central controller of the ad hoc network 100.

At step 505, the nodes 200 contend for use of the control channel 300 to reserve a logical subchannel 430 of the data channel 400. In accordance with some embodiments, only the nodes in the active set that have not sent a channel sense message (CSM) in the logical subchannel 430 for a predefined time period contend for the control channel 300 in a first frequency band (Band A) to access the logical subchannel 430 in a second frequency band (Band B). Next, at step 510, the nodes 200 determine whether the contention (also referred to as competition) for the control channel 300 is successful. When the contention for the control channel 300 is completed, then at step 515, a node that wins the contention for use of the control channel 300 sends an announce message on the control channel 300 for announcing a reservation at a particular time period (occurring at future) of the logical subchannel 430 of the data channel 400. Next, at step 520, the node sends a channel sense message on the logical subchannel 430 of the data channel 400 at the reserved time period to facilitate at least one other node within the ad hoc network 100 to perform channel measurements based on the transmitted channel sense message. In accordance with some embodiments, performing channel measurements includes estimating at least one of an average gain or a path loss for each subchannel across the data channel 400.

Returning to step 510, each node that has not won the contention for use of the control channel 300 monitors the logical subchannel 430 of the data channel 400 and performs channel measurements based on at least one other channel sense message received from the at least one other node of the ad hoc network. This allows each node 200 within the ad hoc network 100 to already have a sense of the channel between themselves and other nodes and are thus able to facilitate link quality based routing without flooding both the control channel 300 and data channel 400 with route requests and route replies. This further allows each node 200 within the ad hoc network 100 to use this same measurement of the channel between themselves and other nodes to determine an initial rate and power for use in communications with the at least one other node on the data channel 400.

As can be appreciated by a person skilled in the art, contention for the control channel 300 occurs using contention protocols such as slotted ALOHA, Carrier Sense Multiple Access protocol (CSMA) with exponential backoff, token passing, or any other suitable protocol. In one example, a centralized controller, such as a base station, or an access point, or a cluster head, or a master device within the network is used to assign access to the logical subchannel 430.

In one embodiment, each node 200 contends for the control channel 300 by selecting a communication slot at random from a range of slots [MIN_S, MAX_S] in a frame of the control channel 300. For example, a high priority node can choose a slot in the range [MIN_H, MAX_H] and a low priority node can choose a slot in the range [MIN_L, MAX_L], where MAX_H<MAX_L, and MIN_H<=MIN_L, but MIN_L can be less than, equal to, or greater than MAX_H. Each node 200 of the ad hoc network 100, then monitors for announce messages on the control channel 300 from at least one other node of the ad hoc network 100 while waiting for the selected communication slot to begin. If, at the beginning of the selected communication, the node 200 has not received at least one announce message from any of the other nodes of the ad hoc network 100, then the node 200 concludes that the contention for the control channel 300 is successful and sends an announce message on the selected communication slot on the control channel 300. In accordance with some embodiments, the node 200 periodically determines a time period that has lapsed since the node 200 has sent the announce message. When the node 200 determines that the time period is higher than a standard lapse time period, the node 200 resets a maximum slot value (MAX_S) to a small value, such that the node 200 contends again for the control channel with a higher priority. On the other hand, when the node 200 determines that the time period is lower than a standard lapse time period, the node 200 resets the maximum slot value (MAX_S) to a large value, such that the node 200 contends again with a lower priority.

In another embodiment, an ad hoc network 100 utilizing CSMA with exponential backoff operates by nodes 200 competing to send announce message on the control channel 300 through the use of clear-channel-assessments (CCAs) and backoff timers. In this example, each node 200 selects a backoff timer at random from a range of backoff values [MIN_B, MAX_B]. Nodes 200 that have sent an announce message more recently set the backoff timer to be large while nodes that have not sent an announce message recently set their backoff timer to be small. For example, a high priority node can choose a value in the range [MIN_H, MAX_H] and a low priority node can choose a value in the range [MIN_L, MAX_L], where MAX_H<MAX_L, and MIN_H<=MIN_L, but MIN_L can be less than, equal to, or greater than MAX_H. Similar to the slotted method described previously, each node 200 of the ad hoc network 100 then monitors the control channel 300 for announce messages from other nodes within the ad hoc network 100. If the node 200 does not receive an announce message from any other node prior to the expiration of the node's backoff timer, then the node 200 presumes that its contention for the control channel 300 is successful and sends an announce message on the control channel 300. In accordance with some embodiments, the node 200 periodically determines a time period that has lapsed since the node 200 has sent the announce message. When the node 200 determines that the time period is higher than a standard lapse time period, the node 200 resets a maximum backoff timer value (MAX_B) to a small value, such that the node 200 contends again for the control channel 300 with a higher priority. On the other hand, when the node 200 determines that the time period is lower than a standard lapse time period, the node 200 resets the maximum backoff timer value (MAX_B) to a large value, such that the node 200 contends again with a lower priority.

In yet another example, the node 200 contends for the control channel 300 by contending for a logical channel within the control channel 300. In this example, priority can be modeled as a threshold that decreases over time making it more likely that the nodes 200 transmit an announce message as time moves forward. For example, low priority nodes can choose a value in the range [MIN_L, MAX_L] while high priority nodes choose a value in the range [MIN_H, MAX_H], where MAX_H<MAX_L, and MIN_H<=MIN_L, but MIN_L can be less than, equal to, or greater than MAX_H. In this example, the node 200 selects a backoff value at random from a range of values, such that whenever the selected backoff value exceeds a system defined threshold, then the node 200 considers itself to have won the contention for the control channel 300. The node 200 then sends the announce message on the logical channel of the control channel 300. In accordance with some embodiments, the node 200 periodically determines a time period that has lapsed since the node 200 has sent the announce message. When the node 200 determines that the time period is higher than a standard lapse time period, the node 200 resets the system defined threshold to a small threshold value, such that the node 200 contends again for the control channel 300 with a higher priority. On the other hand, when the node 200 determines that the time period is lower than a standard lapse time period, the node 200 resets the system defined threshold to a large threshold value, such that the node 200 contends again with a lower priority.

Figure 6:
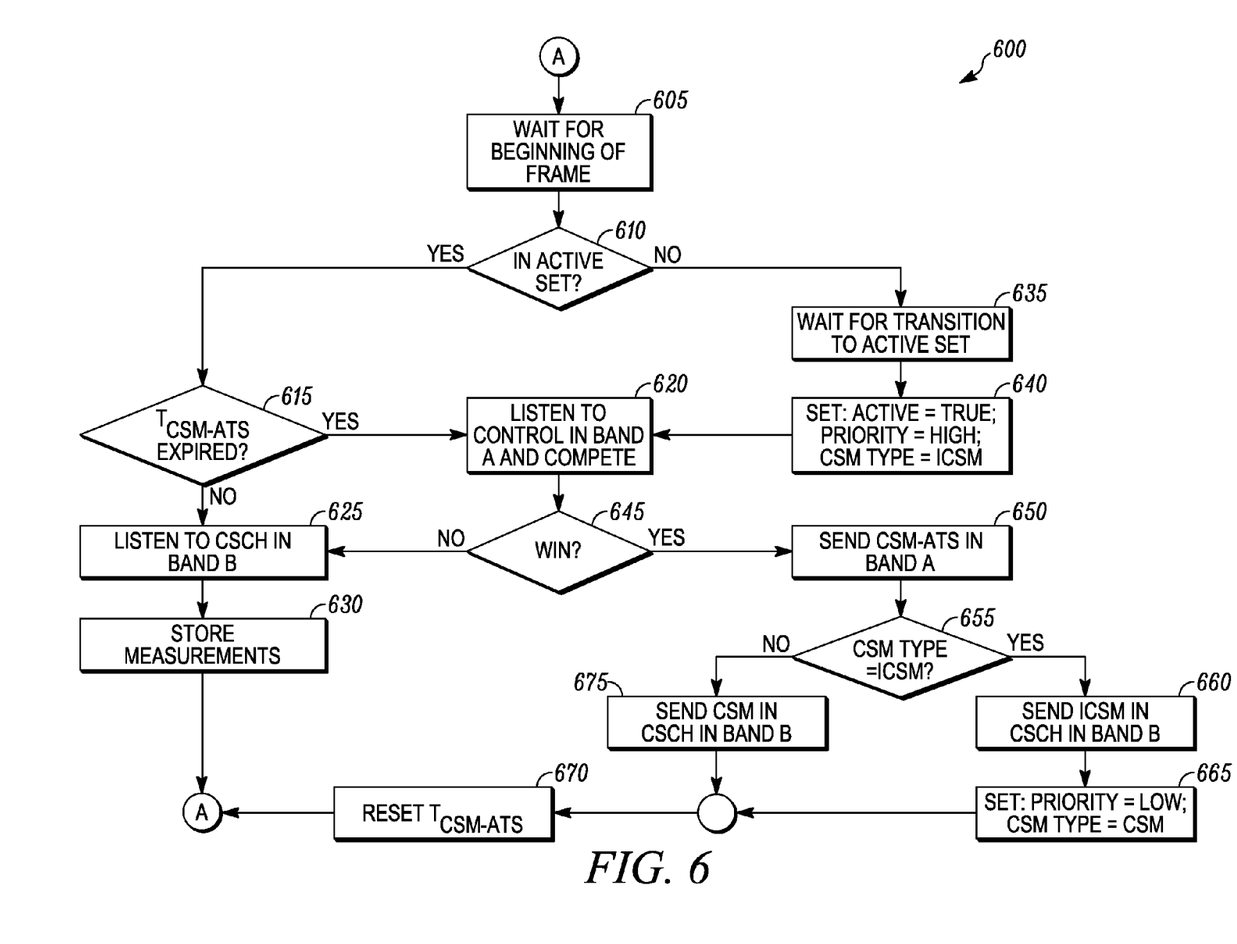
FIG. 6 is a flowchart of operation of a node using a single transceiver for facilitating channel measurements in a communication network in accordance with some embodiments.

FIG. 6 is a flowchart of operation of a node using a single transceiver for facilitating channel measurements in a communication network in accordance with some embodiments. The operation 600 is initiated when the single transceiver 202 of the node 200 is tuned or switched to a control channel 300 operating in a first frequency band. At step 605, the node 200 waits for the beginning of a frame in the control channel 300. Next, at step 610, at the beginning of a frame in the control channel 300, the node 200 checks whether the node 200 belongs to an active set of the ad hoc network 100. If the node 200 belongs to the active set, then the node proceeds to step 615 to determine if a timer ($T_{Channel\ Sense\ Message-Announce\ to\ Send\ (CSM-ATS)}$) has expired. In one example, the timer ($T_{CSM-ATS}$) indicates a time period that has lapsed since the node 200 has sent a channel sense message in a logical subchannel 430, e.g. channel sense logical channel (CSCH), of the data channel 400. If the timer ($T_{CSM-ATS}$) has expired, then the node 200 proceeds to step 620 to listen to the control channel 300 operating in the first frequency band and compete with the other nodes for the control channel 300 to access the CSCH of the data channel 400. Returning to step 615, if the timer ($T_{CSM-ATS}$) for the node 200 has not yet expired, then the node 200 tunes its receiver at the appropriate time to listen to the CSCH in Band B as shown in step 625. The node 200 then calculates the channel measurements between itself and other nodes based on received channel sense messages from other nodes and stores the calculated channel measurements at step 630.

Returning to step 610, when the node 200 determines that it is not in the active set, the node 200 waits for transition to the active set at step 635. When the node 200 transitions to active set, the node 200 proceeds to step 640 and changes its status as active and places itself in the active set of the ad hoc network 100. Also, at step 640, the node 200 sets its priority status as a high priority node and changes the message type of the channel sense message that is to be transmitted on the CSCH as an initial channel sense message (ICSM). As used herein, a message type namely "initial channel sense message" indicates that the node 200 has recently transitioned from an inactive set to an active set and therefore the node is competing with a higher priority, for example, the node has a smaller backoff window than other currently active nodes. While the ICSM type may result in the transmission of a message body different from that of a CSM, the message types need not be different. The node 200 then proceeds to step 620 to listen to the control channel 300 and competes for the control channel 300 with high priority.

Next, at step 645, the node 200 determines whether the node 200 has won the competition. When the node 200 wins the competition, the node proceeds to step 650 to send an announce message, e.g. a channel sense message-announce to send (CSM-ATS) on the control channel 300 operating in the first frequency band (Band A). This transmission of CSM-ATS message serves to mark the end of the competition for accessing the CSCH. As mentioned previously, the termination criteria for the CSM competition are dependent upon the competition method implemented for the ad hoc network 100. Competition methods include, but are not limited to, slotted ALOHA, CSMA with exponential backoff, token passing or any other suitable protocol. Alternatively, a centralized controller, such as a base station, or an access point, or a cluster head, or a master device, and the like, within the ad hoc network 100 is used to assign access to the CSCH.

As can be appreciated by a person skilled in the art, sending of CSM-ATS by the node 200 indicates a reservation of CSCH at a particular time period to send a channel sense message (CSM). However, embodiments of the present disclosure do not preclude multiple nodes from declaring themselves winners of the competition and subsequently transmitting CSM messages simultaneously in the CSCH, potentially resulting in collision of packets carrying CSM messages at other nodes. Furthermore, collision of packets carrying CSM-ATS on the control channel 300 can result in other nodes continuing to compete for accessing the CSCH.

Now turning to step 650, after sending the CSM-ATS message on the control channel 300, the node 200 proceeds to step 655, where the node 200 checks whether the type of the channel sense message that is to be sent on the CSCH is an initial channel sense message (ICSM). If the message type is ICSM, then at step 660, the transceiver 202 of the node 200 switches to the data channel 400 operating in second frequency band (Band B) and sends an ICSM in the CSCH of the data channel 400 operating in the second frequency band (Band B). Next at step 665, the node 200 resets its priority status as a lower priority node and further changes the message type as CSM. Next, at 670, the node 200 resets the timer ($T_{CSM-ATS}$).

Returning to step 655, when the node 200 determines that the message type is not an ICSM, the transceiver 202 of the node 200 switches to data channel 400 operating in Band B and sends CSM in CSCH of the data channel 400 operating in Band B as shown in step 675 and further resets the timer ($T_{CSM-ATS}$) at step 670.

Now returning to 645, when the node 200 determines that it has not won the competition (i.e. if the contention for the control channel 300 is not successful), then the node 200 proceeds to step 625 to tune its receiver to listen to the CSCH in Band B. The node 200 then calculates the channel measurements between itself and the transmitting nodes based on received channel sense messages from other nodes and stores the calculated channel measurements as shown in step 630.

Figure 7:
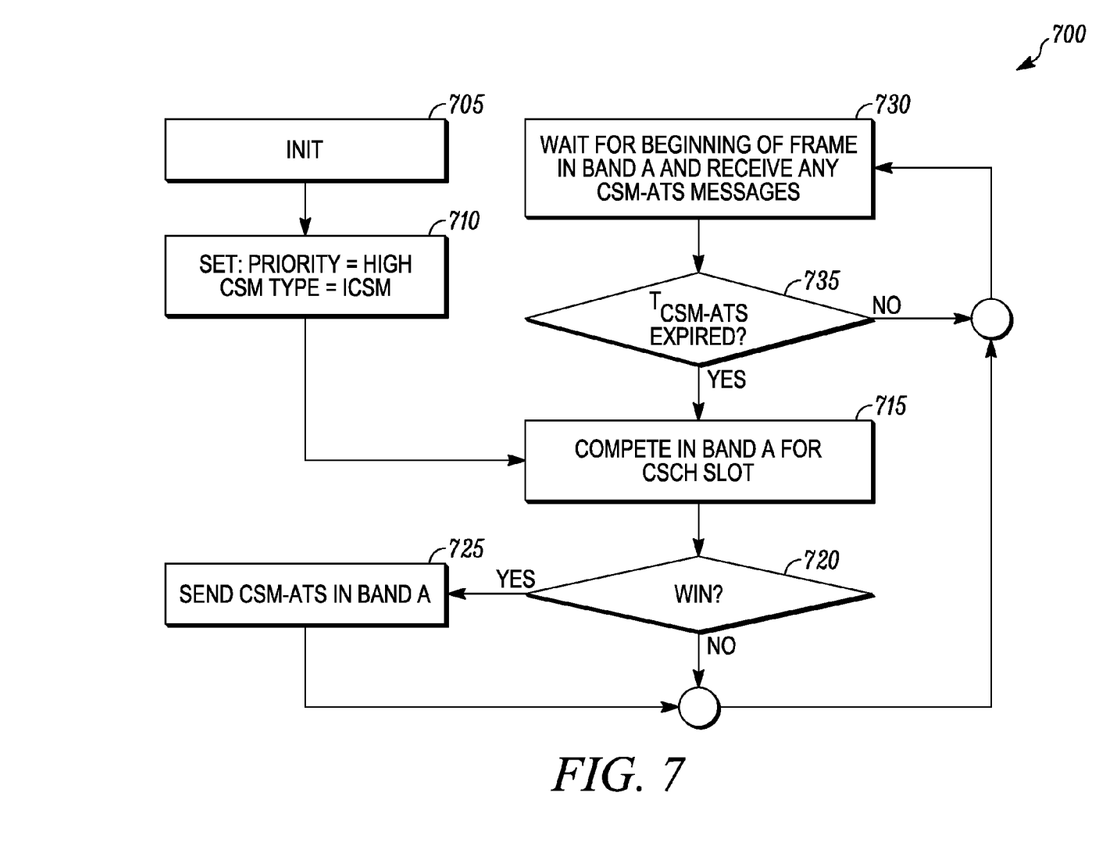
FIG. 7 is a flowchart of operation of a node using dual transceivers for facilitating channel measurements in a communication network in accordance with some embodiments.

FIG. 7 is a flowchart of operation of a node using dual transceivers for facilitating channel measurements in a communication network in accordance with some embodiments. The operation 700 is initialized at step 705 when a first transceiver 202 (also referred to as a control channel transceiver 202) of the dual transceivers of the node 200 is tuned or switched to a control channel 300 operating in a first frequency band (Band A). Next, at step 710, the node 200 sets the priority status as a high priority node and further changes the message type to ICSM. Next at step 715, the node 200 competes for the control channel 300 to access CSCH of the data channel 400. At step 720, the node 200 then determines whether the node 200 has won the competition. When the node 200 wins the competition, the node 200 proceeds to step 725 and sends an announce message CSM-ATS on the control channel 300 in Band A. Either after sending CSM-ATS in Band A as shown in 725 or if the node 200 has not won the competition for the control channel 300 at step 720, then the node 200 proceeds to step 730 to wait for the beginning of a frame in Band A and receive any CSM-ATS messages. Next at step 735, the node 200 determines whether the timer ($T_{CSM-ATS}$) is expired for the node 200. When the timer ($T_{CSM-ATS}$) for the node 200 is expired, the node 200 again competes for the control channel 300 in Band A to access the CSCH of the data channel 400 as shown in step 715. Returning to step 735, when the node 200 determines that the timer ($T_{CSM-ATS}$) has not yet expired, the node 200 proceeds to wait for beginning of a next frame in Band A and receive any CSM_ATS messages from other nodes of the ad hoc network 100.

Figure 8:
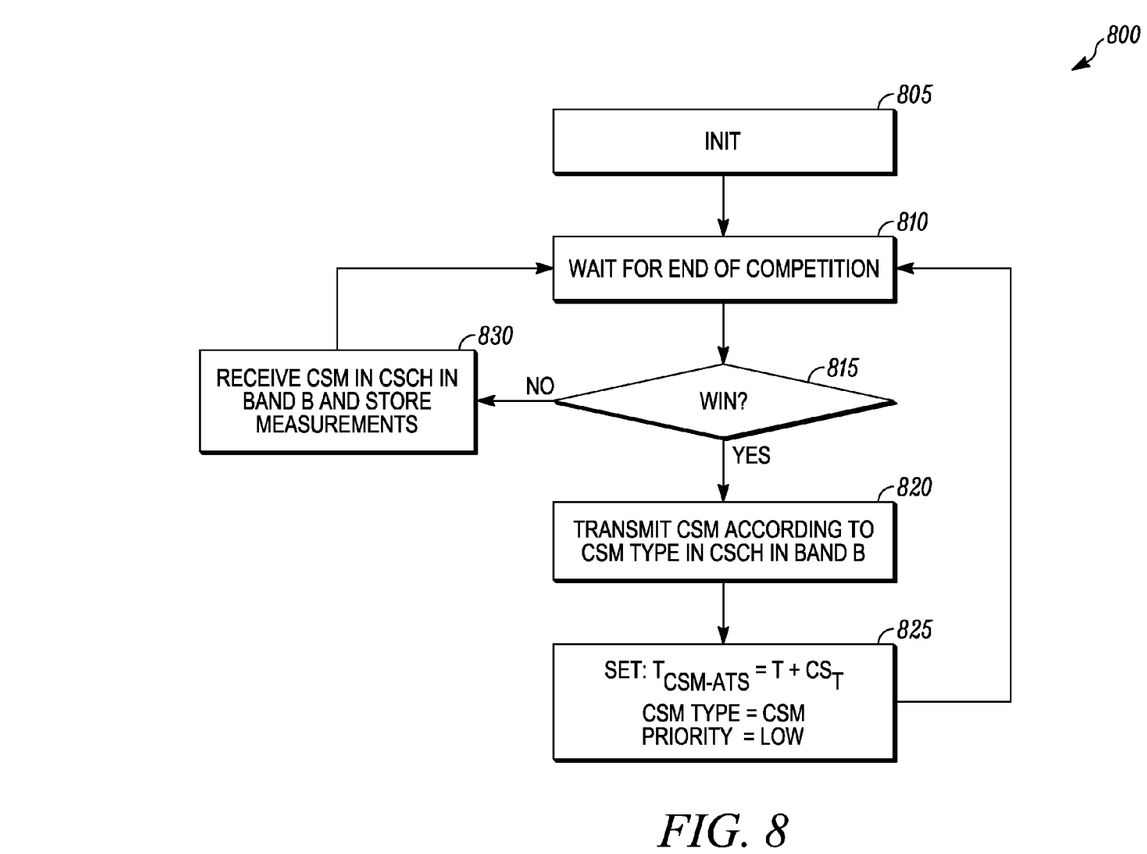
FIG. 8 is a flowchart of operation of a node using dual transceivers for facilitating channel measurements in a communication network in accordance with some embodiments.

FIG. 8 is a flowchart of operation of a node using dual transceivers for facilitating channel measurements in a communication network in accordance with some embodiments. The operation 800 is initialized at 805 when a second transceiver 202 (also referred to as a data channel transceiver 202) of the dual transceivers of the node 200 is tuned or switched to a data channel 400 operating in a second frequency band (Band B). The node 200 then waits for the end of the competition for the control channel 300 at step 810. Next at step 815, after the end of the competition, the node 200 determines whether it has won the competition. When the node 200 wins the competition, the node 200 proceeds to step 820 to transmit CSM according to the message type in CSCH in Band B. Next, at step 825, the node 200 resets the timer ($T_{CSM-ATS}$) by adding a time value T to a time period ($CS_T$) that has lapsed since the node sent the CSM. Further, at step 825, the node sets the priority status as a low priority node and changes the message type to CSM. Now turning to step 815, when the node 200 determines that the node 200 has not won the competition, the node 200 proceeds to step 830 to receive CSM in CSCH in Band B and store channel measurements.

In accordance with embodiments of the present invention, channel measurements estimated by a node can be integrated over time to support link quality assessment. The link quality assessment can be used in a number of manners, including initial rate and power control as well as route selection. For example, when two nodes begin packet exchange with one another, the two nodes can choose to use the lowest rate and highest power to increase their probability of a successful packet exchange. However, if the nodes had a sense of the quality of the link between them, then the nodes can instead choose a higher rate and lower power, based on the link quality estimate and transfer the same amount of data in less time or using less power.

As can be appreciated by a person skilled in the art, according to one embodiment, the channel sense message can be used for more than performing channel measurements given that the channel sense message is a broadcast message. For example, the channel sense message can be used by other active nodes in the network to determine a node's viability for participating in a new or existing route.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operation of a node to facilitate channel measurements in a communication network, comprising:
at the node in the communication network:
contending for a control channel to reserve a logical subchannel of a data channel, wherein the control channel operates in a first frequency band and the data channel operates in a second frequency band, wherein contending for the control channel comprises:
requesting a centralized controller to reserve the logical subchannel of the data channel, wherein the centralized controller coordinates the reservation of the data channel among the nodes in the communication network, and
concluding that the contention for the control channel is successful upon receiving a response from the centralized controller specifying that the centralized controller has reserved the logical subchannel of the data channel for the node;
sending an announce message on the control channel for announcing a reservation of a particular time period of the logical subchannel of the data channel when the contention for the control channel is successful;
sending a channel sense message on the logical subchannel of the data channel at the particular time period to facilitate at least one other node to perform channel measurements based on the channel sense message; and
monitoring the logical subchannel of the data channel and performing channel measurements based on at least one other channel sense message received from the at least one other node when the contention for the control channel is not successful.

2. The method of claim 1, further comprising prior to contending for the control channel,
determining that a node status of the node is active, and
determining that a predefined time period (TCSM-ATS) has lapsed since the node has sent a previous announce message.

3. The method of claim 2, wherein the determining that the node status of the node is active, comprises at least one of
determining that the node is currently participating in a data communication with the at least one other node, or
determining that the node is preparing to participate in a data communication with the at least other node, or
determining that the node is temporarily transitioning from a standby state to check if there is data awaiting for the reception from the at least one other node.

4. The method of claim 1, wherein contending for the control channel comprises
selecting a communication slot at random from a range of slots on the control channel,
monitoring for announce messages on the control channel from the at least one other node until the selected communication slot begins,
concluding that the contention for the control channel is successful when the node has not received a single announce message from the at least one other node at the beginning of the selected communication slot, and sending the announce message on the selected communication slot on the control channel upon concluding that the contention for the control channel is successful.

5. The method of claim 4, further comprising determining a time period that has lapsed since the node has sent the announce message, and resetting a maximum slot value associated with the range of slots to a small value to enable the node to contend for the control channel with a higher priority level, when the time period is higher than a standard lapse time period.

6. The method of claim 5, further comprising resetting the maximum slot value to a large value to enable the node to contend for the control channel with a lower priority level, when the time period is lower than a standard lapse time period.

7. The method of claim 1, further comprising selecting a backoff timer at random from a range of backoff timer values from the control channel, monitoring for announce messages on the control channel from the at least one other node, concluding that the contention for the control channel is successful when the node has not received a single announce message from the at least one other node prior to the lapse of the backoff timer, and sending the announce message on the control channel upon concluding that the contention for the control channel is successful.

8. The method of claim 7, wherein selecting the backoff timer further comprises:

determining a time period that has lapsed since the node has sent the announce message, and resetting a maximum backoff timer value associated with the range of backoff timer values to a small value to enable the node to contend for the control channel with a higher priority level, when the time period is higher than a standard lapse time period.

9. The method of claim 8, further comprising resetting the maximum backoff timer value to a large value to enable the node to contend for the control channel with a lower priority level, when the time period is lower than the standard lapse time period.

10. The method of claim 1, wherein contending for the control channel comprises contending for a logical channel within the control channel.

11. The method of claim 10, wherein contending for the logical channel within the control channel comprises selecting a backoff value at random from a range of values, concluding that the contention for the logical channel of the control channel is successful when the selected backoff value exceeds a system defined threshold, and sending the announce message on the logical channel of the control channel upon concluding that the contention for the control channel is successful.

12. The method of claim 11, further comprising determining a time period that has lapsed since the node has sent the announce message, and resetting the system defined threshold to a small threshold value when the time period is higher than a standard lapse time period.

13. The method of claim 12, further comprising resetting the system defined threshold to a large threshold value when the time period is lower than a standard lapse time period.

14. The method of claim 1, wherein performing channel measurements comprises estimating at least one of an average gain or a path loss for each subchannel across the data channel.

15. The method of claim 1, wherein the first frequency band and the second frequency band are separated such that one or more propagation characteristics of the control channel are independent from one or more propagation characteristics of the data channel.

16. The method of claim 15, wherein the first frequency band comprises a narrowband frequency band and the second frequency band comprises a wideband frequency band.

17. A method for facilitating channel measurements in a communication network utilizing a control channel operating in a first frequency band and a data channel operating in a second frequency band, the method comprising:

at a node in the communication network:

contending for the control channel to reserve a channel sense logical channel (CSCH) of the data channel, wherein contending for the control channel comprises:

requesting a centralized controller to reserve the logical subchannel of the data channel, wherein the centralized controller coordinates the reservation of the data channel among the nodes in the communication network, and concluding that the contention for the control channel is successful upon receiving a response from the centralized controller specifying that the centralized controller has reserved the data channel for the node;

when the contention for the control channel is successful, sending an announce message on the control channel for announcing a reservation of a particular time period of the CSCH of the data channel, and sending a channel sense message (CSM) using the reserved CSCH of the data channel at the particular time period to facilitate at least one other node to perform channel measurements based on the sent channel sense message; and when the contention for the control channel is not successful, monitoring the CSCH of the data channel and performing channel measurements based on at least one other channel sense message received from the at least one other node on the CSCH of the data channel.

18. The method of claim 17, further comprising prior to contending for the control channel, determining that a node status of the node is active, and determining that a predefined time period (TCSM-ATS) has lapsed since the node has sent a previous announce message on the control channel.

19. The method of claim 18, wherein the determining that the node status of the node is active, comprises at least one of determining that the node is currently participating in a data communication with the at least one other node, or determining that the node is preparing to participate in a data communication with the at least one other node, or determining that the node is temporarily transitioning from a standby state to check if there is data awaiting for the reception from the at least one other node.

20. The method of claim 17, wherein contending for the control channel comprises selecting a communication slot at random from a range of slots on the control channel, monitoring for announce messages on the control channel from the at least one other node until the selected communication slot begins, concluding that the contention for the control channel is successful when the node has not received a single announce message from the at least one other node at the beginning of the selected communication slot, and sending the announce message on the selected communication slot on the control channel upon concluding that the contention for the control channel is successful.

21. The method of claim 20, further comprising determining a time period that has lapsed since the node has sent the announce message, and resetting a maximum slot value associated with the range of slots to a small value to enable the node to contend for the control channel with a higher priority level, when the time period is higher than a standard lapse time period.

22. The method of claim 21, further comprising resetting the maximum slot value to a large value to enable the node to contend for the control channel with a lower priority level, when the time period is lower than a standard lapse time period.

23. The method of claim 17, further comprising selecting a backoff timer at random from a range of backoff timer values from the control channel, monitoring for announce messages on the control channel from the at least one other node, concluding that the contention for the control channel is successful when the node has not received a single announce message from the at least one other node prior to the lapse of the backoff timer, and sending the announce message on the control channel upon concluding that the contention for the control channel is successful.

24. The method of claim 23, wherein selecting the backoff timer further comprises:

determining a time period that has lapsed since the node has sent the announce message, and resetting a maximum backoff timer value associated with the range of backoff timer values to a small value to enable the node to contend for the control channel with a higher priority level, when the time period is higher than a standard lapse time period.

25. The method of claim 24, further comprising resetting the maximum backoff timer value to a large value to enable the node to contend for the control channel with a lower priority level, when the time period is lower than the standard lapse time period.

26. The method of claim 17, wherein contending for the control channel comprises contending for a logical channel within the control channel.

27. The method of claim 26, wherein contending for the logical channel within the control channel comprises selecting a backoff value at random from a range of values, concluding that the contention for the logical channel of the control channel is successful when the selected backoff value exceeds a system defined threshold, and sending the announce message on the logical channel of the control channel upon concluding that the contention for the control channel is successful.

28. The method of claim 27, further comprising determining a time period that has lapsed since the node has sent the announce message, and resetting the system defined threshold to a small threshold value when the time period is higher than a standard lapse time period.

29. The method of claim 28, further comprising resetting the system defined threshold to a large threshold value when the time period is lower than a standard lapse time period.

30. The method of claim 17, wherein performing channel measurements comprises estimating at least one of an average gain or a path loss for each subchannel across the data channel.

31. The method of claim 17, wherein the first frequency band and the second frequency band are separated such that one or more propagation characteristics of the control channel are independent from one or more propagation characteristics of the data channel.

32. The method of claim 31, wherein the first frequency band comprises a narrowband frequency band and the second frequency band comprises a wideband frequency band.

33. An ad hoc network utilizing a control channel operating in a first frequency band and a data channel operating in a second frequency band, the ad hoc network comprising:

a plurality of nodes, wherein the plurality of nodes communicate with each other and belong to at least one of an active set or an inactive set, where each of the plurality of nodes belonging to the active set, contends for the control channel to reserve a logical subchannel of the data channel by:

requesting a centralized controller to reserve the logical subchannel of the data channel, wherein the centralized controller coordinates the reservation of the data channel among the nodes in the communication network, and concluding that the contention for the control channel is successful upon receiving a response from the centralized controller specifying that the centralized controller has reserved the data channel for the node;

sends an announce message on the control channel for announcing the reservation of a particular time period of the logical subchannel of the data channel when the contention for the control channel is successful, sends a channel sense message on the logical subchannel of the data channel at the particular time period to facilitate at least one other node of the nodes to perform channel measurements based on the channel sense message, and monitors the logical subchannel of the data channel and performs channel measurements based on at least one other channel sense message received from the at least one other node when the contention for the control channel is not successful.

34. A system for facilitating channel measurements in a communication network utilizing a control channel operating in a first frequency band and a data channel operating in a second frequency band, comprising:

a first transceiver for:

contending for the control channel to reserve a logical subchannel of the data channel by:

requesting a centralized controller to reserve the logical subchannel of the data channel, wherein the centralized controller coordinates the reservation of the data channel among the nodes in the communication network, and concluding that the contention for the control channel is successful upon receiving a response from the centralized controller specifying that the centralized controller has reserved the data channel for the node; and sending an announce message on the control channel after winning the contention for the control channel, for announcing the reservation of a particular time period of the logical subchannel of the data channel; and a second transceiver for:

sending a channel sense message on the logical subchannel of the data channel at the particular time period to facilitate at least one other node to perform channel; and monitoring the logical subchannel of the data channel and performing channel measurements based on an other channel sense message received from the at least one other node.

* * * * *